United States Patent
Hodson et al.

(10) Patent No.: US 7,876,722 B2
(45) Date of Patent: Jan. 25, 2011

(54) SYSTEM AND METHOD FOR WIRELESS COMMUNICATION BETWEEN WIRED FIELD DEVICES AND CONTROL SYSTEM COMPONENTS

(75) Inventors: William R. Hodson, Telford, PA (US);
Prasad Samudrala, Bangalore (IN);
Yu-Gene T. Chen, Glendale, AZ (US);
Alexander Chernoguzov, Warrington, PA (US)

(73) Assignee: Honeywell International Inc., Morristown, NJ (US)

( * ) Notice: Subject to any disclaimer, the term of this patent is extended or adjusted under 35 U.S.C. 154(b) by 1029 days.

(21) Appl. No.: 11/444,042

(22) Filed: May 31, 2006

(65) Prior Publication Data

US 2007/0280178 A1    Dec. 6, 2007

(51) Int. Cl.
*H04W 4/00* (2009.01)
*G08B 1/08* (2006.01)

(52) U.S. Cl. .................. 370/328; 455/445; 340/539.26

(58) Field of Classification Search ........... 340/3.1–3.9, 340/870.01–870.44, 500–558, 825–825.98; 455/410, 411, 445, 423–425; 370/328, 338, 370/401, 241–252, 310
See application file for complete search history.

(56) References Cited

U.S. PATENT DOCUMENTS

| | | | |
|---|---|---|---|
| 6,437,692 B1 * | 8/2002 | Petite et al. ................. | 340/540 |
| 6,847,316 B1 | 1/2005 | Keller | |
| 2002/0120671 A1 | 8/2002 | Daffner et al. | |
| 2002/0122230 A1 | 9/2002 | Izadpanah et al. | |
| 2004/0230899 A1 | 11/2004 | Pagnano et al. | |
| 2004/0259533 A1 | 12/2004 | Nixon et al. | |
| 2005/0059379 A1 * | 3/2005 | Sovio et al. .................. | 455/411 |

(Continued)

FOREIGN PATENT DOCUMENTS

DE    103 14 721 A1    11/2004

(Continued)

OTHER PUBLICATIONS

A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.

(Continued)

*Primary Examiner*—Lester Kincaid
*Assistant Examiner*—Daniel Lai
(74) *Attorney, Agent, or Firm*—Munck Carter, LLP

(57) ABSTRACT

A system for transferring a signal between a field device and a control system component includes a field linking unit and a system gateway. The field linking unit is electrically coupled to a field device, and a signal is transferred between the two using a first protocol. The system gateway is electrically connected to a control system component, and the signal is transferred between the two using a second protocol. The field linking unit and the system gateway communicate wirelessly. One of the field linking unit and the system gateway may encrypt the signal before sending, and the other may decrypt the signal upon receipt. The system may also include at least one intermediate node, and the field linking unit and the system gateway may communicate wirelessly via the intermediate node(s).

20 Claims, 2 Drawing Sheets

U.S. PATENT DOCUMENTS

| | | | |
|---|---|---|---|
| 2005/0141553 A1 | 6/2005 | Kim et al. | |
| 2005/0228509 A1 | 10/2005 | James | |
| 2007/0073861 A1* | 3/2007 | Amanuddin et al. | 709/224 |
| 2007/0153677 A1 | 7/2007 | McLaughlin et al. | |

FOREIGN PATENT DOCUMENTS

| | | |
|---|---|---|
| EP | 1 401 171 A2 | 3/2004 |
| GB | 2 427 329 A | 12/2006 |
| WO | WO 01/35190 A2 | 5/2001 |
| WO | WO 03/079616 A1 | 9/2003 |
| WO | WO 2004/047385 A2 | 6/2004 |
| WO | WO 2006/017994 A1 | 2/2006 |
| WO | WO 2006/053041 A1 | 5/2006 |

OTHER PUBLICATIONS

Pereira J M D, A Fieldbus Prototype for Educational Purposes, IEEE Instrumentation & Measurement Magazine, New York, NY, vol. 7, No. 1, Mar. 2004, pp. 24-31.

International Search Report and Written Opinion of the International Searching Authority in PCT Application No. PCT/US2007/069717 dated Dec. 10, 2007.

International Search Report and Written Opinion of the International Searching Authority in PCT Application No. PCT/US2007/069614 dated Nov. 22, 2007.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

* cited by examiner

SYSTEM AND METHOD FOR WIRELESS COMMUNICATION BETWEEN WIRED FIELD DEVICES AND CONTROL SYSTEM COMPONENTS

TECHNICAL FIELD

This disclosure relates generally to control systems and more specifically to a system and method for wireless communication between wired field devices and control system components.

BACKGROUND

Process control systems typically include field devices and control system components. The field devices may include sensors for measuring the value of a process variable or the status of a process component. The field devices may also include actuators for controlling process equipment such as valves, and relays for controlling process equipment such as motors.

The control system components may include process controllers, safety and alarm monitoring applications, asset management tools, configuration tools, and process historian applications. The field devices and control system components typically communicate with each other via wired connections using a communication protocol.

In some communication protocols, such as the Highway Addressable Remote Transducer (HART) protocol, a separate pair of wires connects each field device to a control system. Such a wire pair may carry an analog control current representing a process variable or a desired actuator position. A low voltage frequency shift keying (FSK) digital signal may be superimposed on the analog control current to enable communication of other information between the HART field device and the control system. Such other information may include configuration information, other process variable information, and device status information.

A HART multiplexer may be used to simplify the wiring of such a system. A multiplexer unit may communicate with individual HART field devices using the combined analog and FSK digital communication protocol described above. A serial digital link may then be used to communicate between the multiplexer unit and a control system using a related digital communication protocol.

In other communication protocols, a control system may communicate with one or more field devices over a wire pair carrying serial digital signals. Foundation Fieldbus (FF) H1 and Profibus are two examples of such a protocol. The number of field devices that may be supported by a single wire pair is limited. Both H1 and Profibus have related protocols (FF HSE and Profinet, respectively), which allow the control system to communicate with an increased number of field devices over a single connection.

Such control systems, however, continue to require that system owners install wired connections of one sort or another between control system components and field devices. This requirement contributes significantly to the cost and complexity of initial installation and expansion of process control systems.

SUMMARY

This disclosure provides a system and method for wireless communication between wired field devices and control system components.

In a first embodiment, a system for transferring a signal between a field device and a control system component includes a field linking unit and a system gateway. The field linking unit is electrically coupled to a field device, and a signal is transferred between the two using a first protocol. The system gateway is electrically coupled to a control system component, and the signal is transferred between the two using a second protocol. The field linking unit and the system gateway communicate wirelessly. The first and second protocols are related protocols. In particular embodiments, the first and second protocols are the same protocol.

In other particular embodiments, one of the field linking unit and the system gateway encrypts the signal before sending the encrypted signal wirelessly. Also, the other of the field linking unit and the system gateway decrypts the encrypted signal upon receipt In yet other particular embodiments, the system further includes a second field linking unit and a second system gateway. The second field linking unit is electrically coupled to a second field device, and a second signal is transferred between the two using a third protocol. The second system gateway is electrically coupled to a second control system component, and the second signal is transferred between the two using a fourth protocol. The second field linking unit and the second system gateway communicate wirelessly. The third and fourth protocols are related protocols or, in other particular embodiments, the same protocol.

In other particular embodiments, the system further includes an intermediate node. The field linking unit and the system gateway communicate wirelessly via the intermediate node. In yet other particular embodiments, the system further includes a plurality of intermediate nodes, and the field linking unit and the system gateway communicate wirelessly via two or more of the intermediate nodes.

In a second embodiment, a method of transferring a signal between a field device and a control system component includes receiving, in a field linking unit, information in a first protocol from a field device to which the field linking unit is electrically coupled. The method also includes communicating the signal wirelessly between the field linking unit and a system gateway. The method further includes transmitting the signal in a second protocol from the system gateway to a control system component to which the system gateway is electrically coupled. The first and second protocols are related protocols. In particular embodiments, the first and second protocols are the same protocol. In other particular embodiments, the signal is communicated wirelessly between the field linking unit and a system gateway directly or via one or mode intermediate nodes.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
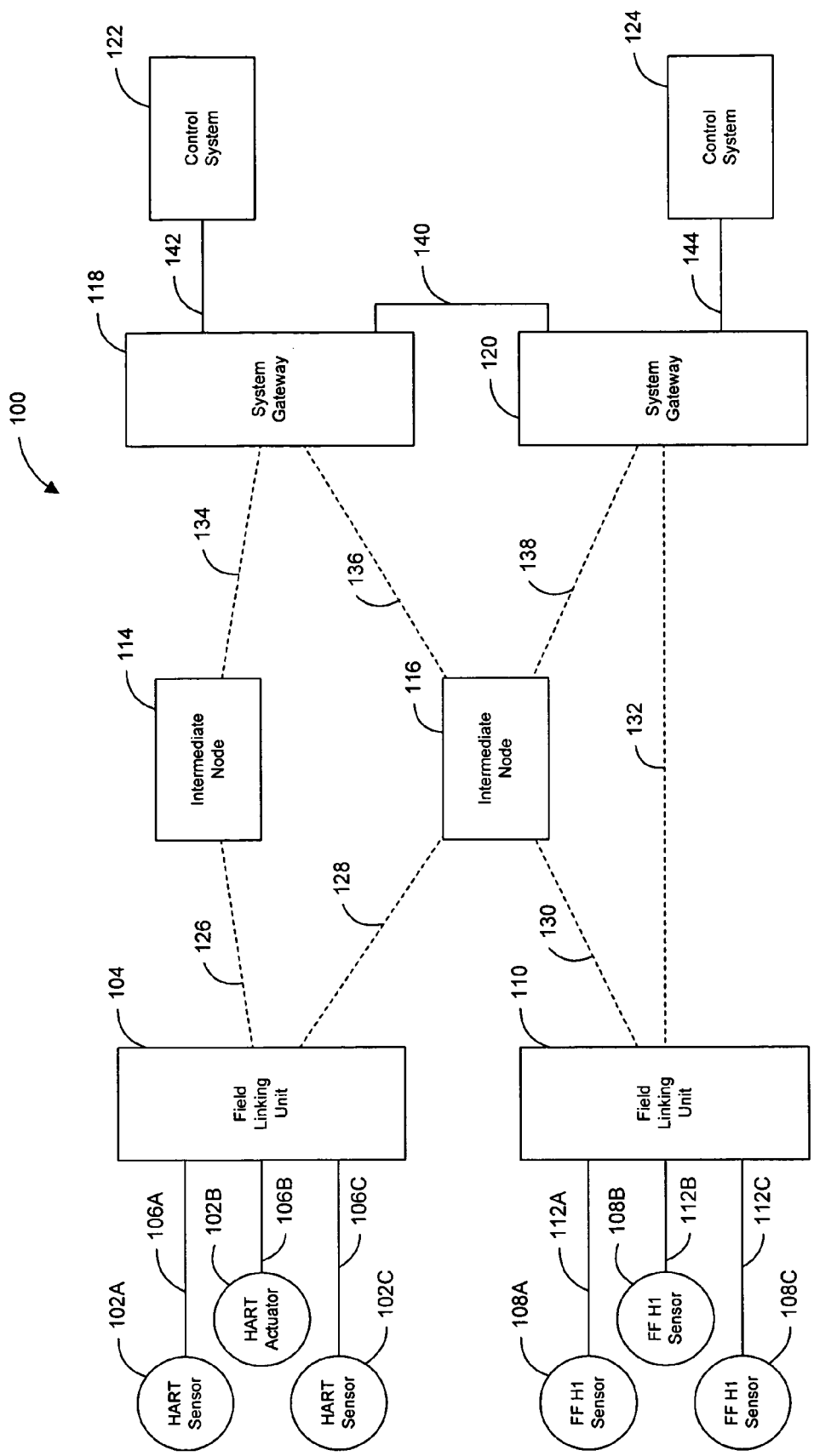
FIG. 1 illustrates an example system for wireless communication between wired field devices and control system components according to one embodiment of this disclosure.

FIG. 1 illustrates an example system 100 for wireless communication between wired field devices and control system components according to one embodiment of this disclosure. The embodiment of the system 100 shown in FIG. 1 is for illustration only. Other embodiments of the system 100 could be used without departing from the scope of this disclosure.

As shown in FIG. 1, the system 100 includes field devices 102A-102C. In this example, the field devices 102A and 102C are sensors, and the field device 102B is an actuator. The field devices 102A-102C may be connected to a field linking unit 104 by wired connections 106A-106C, respectively. Similarly, the system 100 includes field devices 108A-108C. In this example, the field devices 108A-108C are all sensors. The field devices 108A-108C may be connected to a field linking unit 110 by wired connections 112A-112C, respectively.

In the system 100 of FIG. 1, the field devices 102A-102C may communicate with the field linking unit 104 using the HART communication protocol. In contrast, the field devices 108A-108C may communicate with the field linking unit 110 using the Foundation Fieldbus (FF) H1 communication protocol.

The field linking units 104 and 110 may communicate wirelessly with system gateways 118 and 120. The wireless communication may be direct, as shown by wireless link 132. The wireless communication may also be indirect via intermediate nodes 114 and 116, as shown by wireless links 126-130 and 134-138. As a result, redundant wireless paths may be established between the field linking units 104 and 110 and the system gateways 118 and 120.

In this example, the field linking unit 104 may communicate wirelessly with the system gateway 118 by two paths. The first path includes wireless link 126, intermediate node 114, and wireless link 134. The second path includes wireless link 128, intermediate node 116, and wireless link 136. Similarly, the field linking unit 110 may communicate wirelessly with the system gateway 120 either directly via wireless link 132 or indirectly via wireless links 130 and 138 and intermediate node 116. In this way, if one of the wireless links is interrupted or one of the intermediate nodes fails, communication between a field linking unit and a system gateway may continue over an alternate path.

Wireless messages received by one of the system gateways 118 and 120 may be sent to the other one via a wired connection 140. The wired connection 140 may be an Ethernet connection or other serial link. To illustrate, the messages sent by the field linking unit 110 may be received only by the system gateway 120 via direct wireless link 132, but the messages may be required by a control system component coupled to the system gateway 118. In this situation, the information from the field linking unit 110 may be forwarded from the system gateway 120 to the system gateway 118 via connection 140. In another embodiment, the system gateways 118 and 120 may communicate with each other wirelessly via a wireless communication link 140.

In the system 100 of FIG. 1, the system gateway 118 may be coupled by a wired connection 142 to one or more components of a control system 122. The components may be process controllers, safety and alarm monitoring applications, asset management tools, configuration tools, process historian applications, or any other or additional devices or systems. Similarly, the system gateway 120 may be coupled via a wired connection 144 to one or more components of a control system 124.

In this example, the link 142 may be an Ethernet connection, and the system gateway 118 may communicate with an alarm monitoring component in the control system 122 using the Foundation Fieldbus High-Speed Ethernet (FF HSE) communication protocol. In contrast, the link 144 may be an RS-485 connection, and the system gateway 120 may communicate with a process control component in the control system 124 using the HART MUX protocol. In another embodiment, the link 144 may be a plurality of wire pairs, each corresponding to a HART field device 102A-102C, and communication over the link 144 may be done using the HART analog communication protocol with FSK digital signaling.

Although FIG. 1 illustrates one example of a system 100 for wireless communication between wired field devices and control system components, various changes may be made to FIG. 1. For example, the system 100 could include any number of field devices, field linking units, intermediate nodes, system gateways, and control systems. Additionally, elements shown as separate could be combined. A field linking unit may support a plurality of communication protocols, for example, both HART and FF H1. A system gateway may support a plurality of protocols, for example, both HART MUX and FF HSE.

Furthermore, while the field devices and control system components of the system 100 are described as using certain protocols (HART, FF H1, HART MUX, and FF HSE), other embodiments of the system 100 may use any other or additional communication protocols. For example, the Profibus, Profinet, Modbus serial, Modbus Remote Terminal Unit (RTU), Modbus Transmission Control Protocol (TCP), or other protocols may be used.

Figure 2:
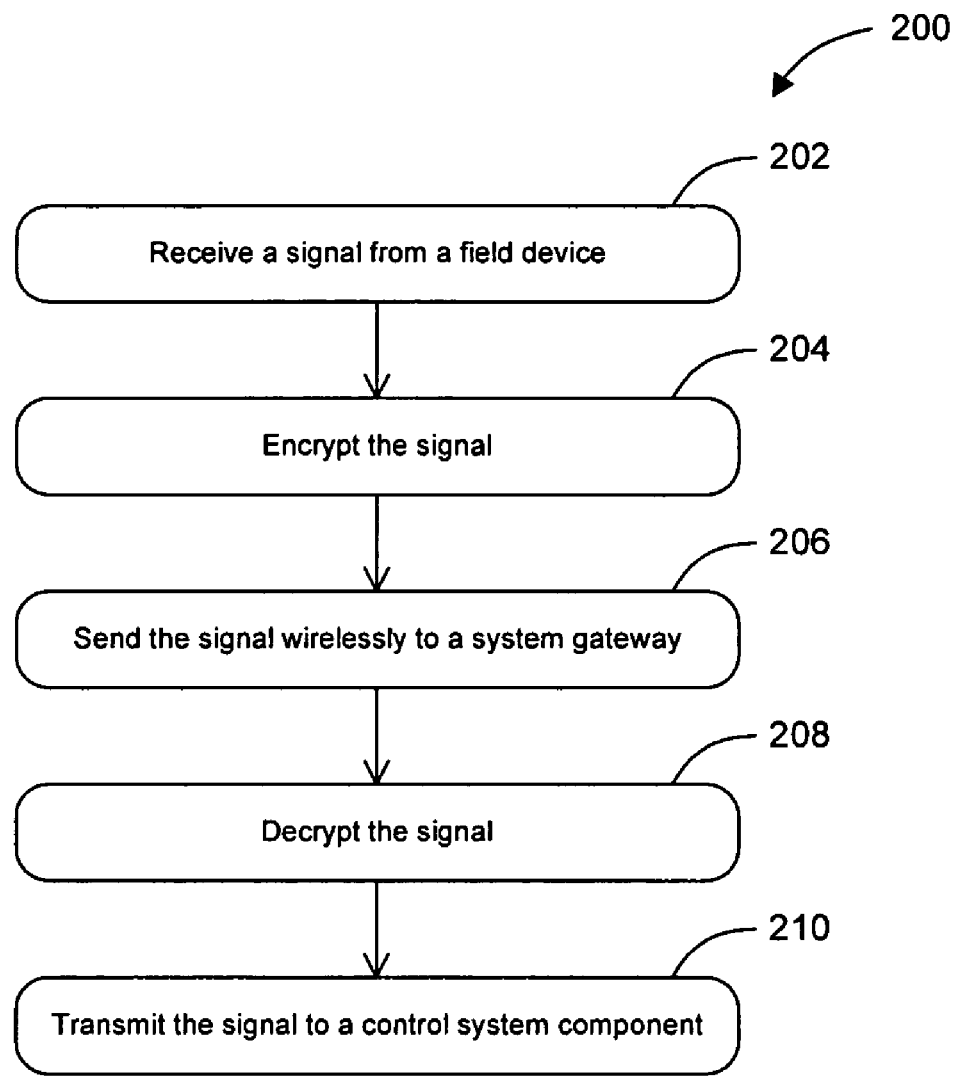
FIG. 2 illustrates an example method for wireless communication between wired field devices and control system components according to one embodiment of this disclosure.

FIG. 2 illustrates an example method 200 for wireless communication between wired field devices and control system components according to one embodiment of this disclosure. While FIG. 2 depicts communication from a field device to a control system component, it will be understood that similar steps may be executed to communicate from a control system component to a field device.

In step 202, a field linking unit may receive a signal from a field device in a first protocol. For example, with reference to the system 100 of FIG. 1, the field linking unit 104 may receive a signal in the HART communication protocol from the field device 102A. The field linking device may encrypt the signal in step 204 and transmit the signal wirelessly in step 206. Encrypting the signal provides greater security for the wireless communications and enables a receiving device to check the signal for tampering and legitimacy.

Once the field linking device has transmitted the encrypted signal, it may be received directly by a system gateway or, as described with reference to FIG. 1, it may be received by an intermediate node and forwarded to a system gateway. In some embodiments, an intermediate node cannot decrypt the signal and simply retransmits it as originally encrypted. As described with reference to FIG. 1, if the signal is intended for a control system component coupled to another system gateway, the receiving system gateway may forward the signal to the other system gateway. For example, with reference to the system 100 of FIG. 1, the system gateway 118 may receive the encrypted signal transmitted by the field linking unit 104 and forward the received signal to the system gateway 120 via communication link 140.

Once a system gateway receives the encrypted signal, it decrypts the signal in step 208. In step 210, the system gateway may then transmit the decrypted signal in its original communication protocol to a control system component. In the embodiment of the system 100 shown in FIG. 1, however, the HART signal received in the system gateway 120 from the field device 102A could be converted into the related HART MUX protocol before being transmitted to the control system 124. In another embodiment of the system 100, the field linking unit 104 may translate the HART signal received from the field device 102A into the HART MUX protocol prior to encrypting the signal for sending to the system gateway 118.

In particular embodiments, signals received in one communication protocol may be converted into a related protocol prior to encryption and wireless transmission. In other particular embodiments, the conversion may be performed after wireless reception and decryption.

To illustrate operation of a particular embodiment of the system 100, reference is again made to FIG. 1, and an example series of signals sent between an alarm monitoring application in the control system 122 and the field device 108C is described. A similar sequence of actions may be performed to communicate wirelessly between, for example, a process controller in the control system 124 and one of the field devices 102A-102C.

A system operator may initially use a configuration tool to configure the system gateway 118 and the field linking unit 104. The configuration tool may be in wired or wireless communication with the system gateway 118 and the field linking unit 104. The configuration tool may use a device descriptor file authored by the manufacturer of the field device 108C to configure the wireless devices with the command set, message format, and other information relating to the field device 108C.

An alarm monitoring application in the control system 122 may send a command to the field device 108C, such as a command to set an allowable value range for a process variable monitored by the field device 108C. The alarm monitoring application may send this command via the Ethernet link 142 to the system gateway 118 in the FF HSE communication protocol. The system gateway 118 may encrypt the message, still in the FF HSE protocol, and forward it to the field linking unit 110 via the wireless link 136, the intermediate node 116, and the wireless link 130. Alternatively, the system gateway 118 may forward the message to the field linking unit 110 via the wired link 140, system gateway 120, and the wireless link 132 in the FF HSE protocol. The field linking unit 110 may then decrypt the message, convert the message to FF H1 protocol, and forward it to the field device 108c via the wired link 112C.

If the field device 108C detects a process variable value outside the indicated range, it may send an alarm signal in the FF H1 protocol to the field linking unit 110 via the wired connection 112C. The field linking unit 110 may then convert the signal to FF HSE protocol, encrypt the signal, attach additional information identifying itself and the field device 108C as the origin of the signal and the alarm monitoring application in the control system 122 as the intended recipient, and send the resulting message wirelessly to the intermediate node 116 and the system gateway 120.

The intermediate node 116 may forward the message to the system gateway 118 via wireless link 136. The system gateway 120 may forward the message to the system gateway 118 via the communication link 140. The system gateway 118 may recognize from other additional information in the messages that the messages received from the intermediate node 116 and the system gateway 120 are two copies of the same message and retain only one copy for processing. The system gateway 118 may then decrypt the message to recover the signal and transmit it in the FF HSE protocol via wired link 142 to the alarm monitoring application in the control system 122. The control system 122 may issue an acknowledgement the alarm message by the same set of steps used to send the command to set the allowable value range.

As used herein, the term "wireless" communication indicates the transmission of data via an ambient medium, for example, air. A non-wireless communication includes a communication achieved by transmission of data via a physical conduit, channel, or other communication path. Examples of such physical communication paths for non-wireless communication include copper or other conductive wires, optical fibers, coaxial and other cables, and any of a plethora of other known or to be developed communication or transmission lines. No specific structure is implied by either term (wireless or non-wireless), nor is the use of a particular band of frequencies, wavelengths, bit rates, or modulation protocols implied.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A communication system comprising:
a field linking unit electrically coupled to a field device and operable to transfer a plurality of signals between the field device and the field linking unit using a first protocol;
a first system gateway electrically coupled to a first control system component via a first communication link; and
a second system gateway coupled to the first system gateway via a second communication link, electrically coupled to a second control system component via a third communication link, and operable to transfer at least some of the plurality of signals between the second system gateway and the second control system component using a second protocol via the third communication link, wherein the first communication link is physically separate from the third communication link;
wherein:
the field linking unit and the first system gateway are operable to communicate wirelessly,
the first system gateway is operable to:
transfer a first signal of the plurality of signals to the first control system component via the first communication link based on a first indication that the first signal is required by the first control system component, and
forward a second signal of the plurality of signals to the second system gateway via the second communication link based on a second indication in the second signal that the second signal is required by the second control system component, and
the first protocol and the second protocol are related protocols.

2. The communication system of claim 1, wherein the first protocol and the second protocol are the same protocol.

3. The communication system of claim 1, wherein the field device is one of a plurality of field devices electrically coupled to the field linking unit.

4. The communication system of claim 1, wherein the field linking unit is one of a plurality of field linking units operable to wirelessly communicate with the first system gateway.

5. The communication system of claim 1, wherein:
one of the field linking unit and the first system gateway is operable to encrypt the plurality of signals before sending the encrypted signals wirelessly; and
the other of the field linking unit and the first system gateway is operable to decrypt the encrypted signals upon receipt.

6. The communication system of claim 1, further comprising:
a second field linking unit electrically coupled to a second field device and operable to transfer a third signal between the second field device and the second field linking unit using a third protocol;
wherein the second system gateway is operable to transfer the third signal between the second system gateway and the second control system component using a fourth protocol;
wherein the second field linking unit and the second system gateway are operable to communicate wirelessly, and the third protocol and the fourth protocol are related protocols.

7. The communication system of claim 6, wherein the third protocol and the fourth protocol are the same protocol.

8. The communication system of claim 1, further comprising an intermediate node, wherein the field linking unit and the first system gateway are operable to communicate wirelessly via the intermediate node.

9. The communication system of claim 1, further comprising a plurality of intermediate nodes, wherein the field linking unit and the first system gateway are operable to communicate wirelessly via two or more of the intermediate nodes.

10. The communication system of claim 9, wherein:
the field linking unit is one of a plurality of field linking units; and
at least two communication paths exist between each field linking unit and the first system gateway.

11. A method comprising:
receiving in a field linking unit a plurality of signals in a first protocol from a field device, wherein the field device and the field linking unit are electrically coupled;
communicating the plurality of signals wirelessly between the field linking unit and a first system gateway;
transferring a first signal of the plurality of signals to a first control system component that is electrically coupled to the first system gateway via a first communication link, the first signal transferred based on a first indication that the first signal is required by the first control system component;
forwarding a second signal of the plurality of signals from the first system gateway to a second system gateway via a second communication link based on a second indication in the second signal that the second signal is required by a second control system component that is electrically coupled to the second system gateway via a third communication link, wherein the first communication link is physically separate from the third communication link; and
transmitting the second signal in a second protocol from the second system gateway to the second control system component via the third communication link, wherein the first and second protocols are related protocols.

12. The method of claim 11, wherein the first protocol and the second protocol are the same protocol.

13. The method of claim 11, wherein the field device is one of a plurality of field devices electrically coupled to the field linking unit.

14. The method of claim 11, wherein the field linking unit is one of a plurality of field linking units operable to wirelessly communicate with the first system gateway.

15. The method of claim 11, wherein communicating the signals wirelessly between the field linking unit and the first system gateway comprises:
encrypting the signals in the field linking unit; and
decrypting the encrypted signals in the system gateway.

16. The method of claim 11, further comprising:
receiving in a second field linking unit a third signal in a third protocol from a second field device, wherein the second field device and the second field linking unit are electrically coupled;
communicating the third signal wirelessly between the second field linking unit and the second system gateway; and
transmitting the third signal in a fourth protocol from the second system gateway to the second control system component, wherein the third and fourth protocols are related protocols.

17. The method of claim 16, wherein the third protocol and the fourth protocol are the same protocol.

18. The method of claim 11, wherein communicating the signals wirelessly to the first system gateway comprises:

communicating the signals wirelessly between the field linking unit and an intermediate node; and communicating the signals wirelessly between the intermediate node and the first system gateway.

19. The method of claim 18, wherein communicating the signals wirelessly to the first system gateway further comprises:

communicating the signals wirelessly between the field linking unit and a second intermediate node; and communicating the signals wirelessly between the second intermediate node and the first system gateway.

20. The method of claim 11, wherein:

the field linking unit is one of a plurality of field linking units; and at least two communication paths exist between each field linking unit and the first system gateway.

\* \* \* \* \*